Patented May 24, 1932

1,859,288

UNITED STATES PATENT OFFICE

WALTER G. CHRISTIANSEN, OF BLOOMFIELD, NEW JERSEY, AND WERNER M. LAUTER, OF AKRON, OHIO, ASSIGNORS TO E. R. SQUIBB & SONS, OF NEW YORK, N. Y., A CORPORATION OF NEW YORK

BISMUTH ALKALINE-EARTH-METAL THIOGLYCOLATES AND PROCESS OF MAKING SAME

No Drawing.     Application filed March 23, 1929.  Serial No. 349,511.

Our invention relates to the new compounds bismuth alkaline-earth-metal thioglycolates, particularly bismuth calcium thioglycolate $Bi_2(SCH_2COO)_6Ca_3$; and to the preparation thereof; and it is the object of our invention to obtain these compounds, which have given evidence of therapeutic value, in a pure state.

Essentially our process consists in successively adding to warm water the following: thioglycolic acid, a basic bismuth compound, preferably bismuthyl hydroxide (i. e., $BiOOH$), and an alkaline-earth-metal compound, preferably calcium carbonate—preferably in the respective molar proportions of six, two, and three—and precipitating slowly with alcohol, the operations being preferably performed under anaeric conditions. By employing alcohol as a precipitant and adding it slowly, we preclude the adulteration of our desired product with such substances as calcium dithioglycolate.

As a specific example, 5 grams of thioglycolic acid and 3.2 grams of bismuthyl hydroxide are shaken with 25 cubic centimeters of water at steam-bath temperature, and the mixture is filtered to remove the small quantity of undissolved matter and treated with 3 grams of calcium carbonate. After warming on a steam bath, there remains a trace of insoluble matter, which is eliminated by filtration, leaving 55 cubic centimeters of a clear bright-yellow liquid, which is then added slowly to 110 cubic centimeters of 95% alcohol. Now the yellow precipitate is filtered off and washed successively with 50 cubic centimeters of 70% alcohol, 50 cubic centimeters of 95% alcohol, and ether. Throughout the process, the reaction mixture is blanketed with an atmosphere of carbon dioxide.

The mass of the bright-yellow lightweight powder yielded is 5 grams. This powder when heated above 102° centigrade gives bismuth sulfide; and it dissolves readily in water, forming a neutral solution that is not affected by carbon dioxide or by boiling for ten minutes and that precipitates bismuth sulfide quantitatively with hydrogen sulfide.

It is to be understood that the preferred process and product herein described are illustrative, but not definitive, of our invention, which may be otherwise embodied within the scope of the appended claims.

We claim:

1. Bismuth alkaline-earth-metal thioglycolates.

2. Bismuth calcium thioglycolate.

3. A compound of bismuth and calcium with thioglycolic acid that is a lightweight bright-yellow powder yielding bismuth sulfide when heated above 102° centigrade and that readily dissolves in water, the solution being neutral, unaffected by carbon dioxide or by boiling for ten minutes, and precipitating bismuth sulfide quantitatively with hydrogen sulfide.

4. Preparing bismuth calcium thioglycolate by successively adding to water the following: thioglycolic acid, bismuthyl hydroxide, and calcium carbonate; and introducing into alcohol, the reaction mixture being maintained in an anaeric condition throughout the process.

5. The method of preparing bismuth calcium thioglycolate which comprises mixing thioglycolic acid with bismuthyl hydroxide in warm water, treating with calcium carbonate, and adding the mixture to 95% alcohol.

6. The method of preparing bismuth calcium thioglycolate which comprises agitating thioglycolic acid and bismuthyl hydroxide together in water, treating with calcium carbonate, and slowly adding to 95% alcohol.

7. The method of preparing bismuth calcium thioglycolate which comprises agitating thioglycolic acid and bismuthyl hydroxide together in water, treating with calcium carbonate, and adding the mixture to 95% alcohol, the process being performed in an atmosphere of carbon dioxide.

8. The method of preparing bismuth calcium thioglycolate which comprises mixing thioglycolic acid with bismuthyl hydroxide in warm water, treating with calcium carbonate, and adding to alcohol, the reaction mixture being protected throughout with an atmosphere of carbon dioxide.

In testimony whereof we affix our signatures.

WALTER G. CHRISTIANSEN.
WERNER M. LAUTER.